Nov. 23, 1937.  G. M. CUTLER  2,099,675
GEARING FOR DRIVING SUPERCHARGERS ON AIRCRAFT ENGINES
Filed Nov. 2, 1936   2 Sheets—Sheet 1
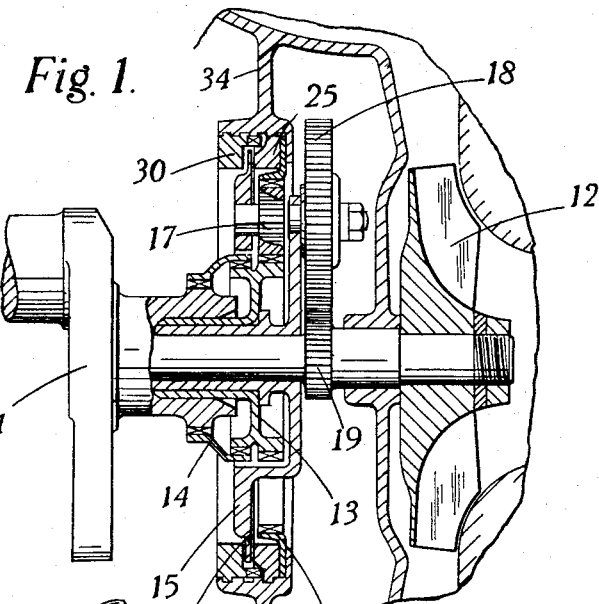
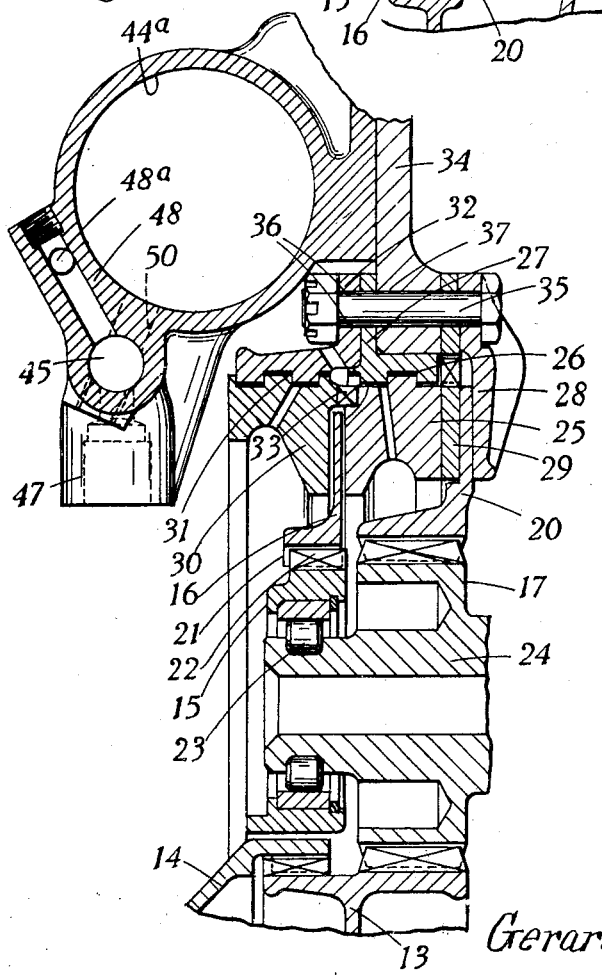
INVENTOR
Gerard M. Cutler
BY
Mawhinney & Mawhinney
ATTORNEYS.

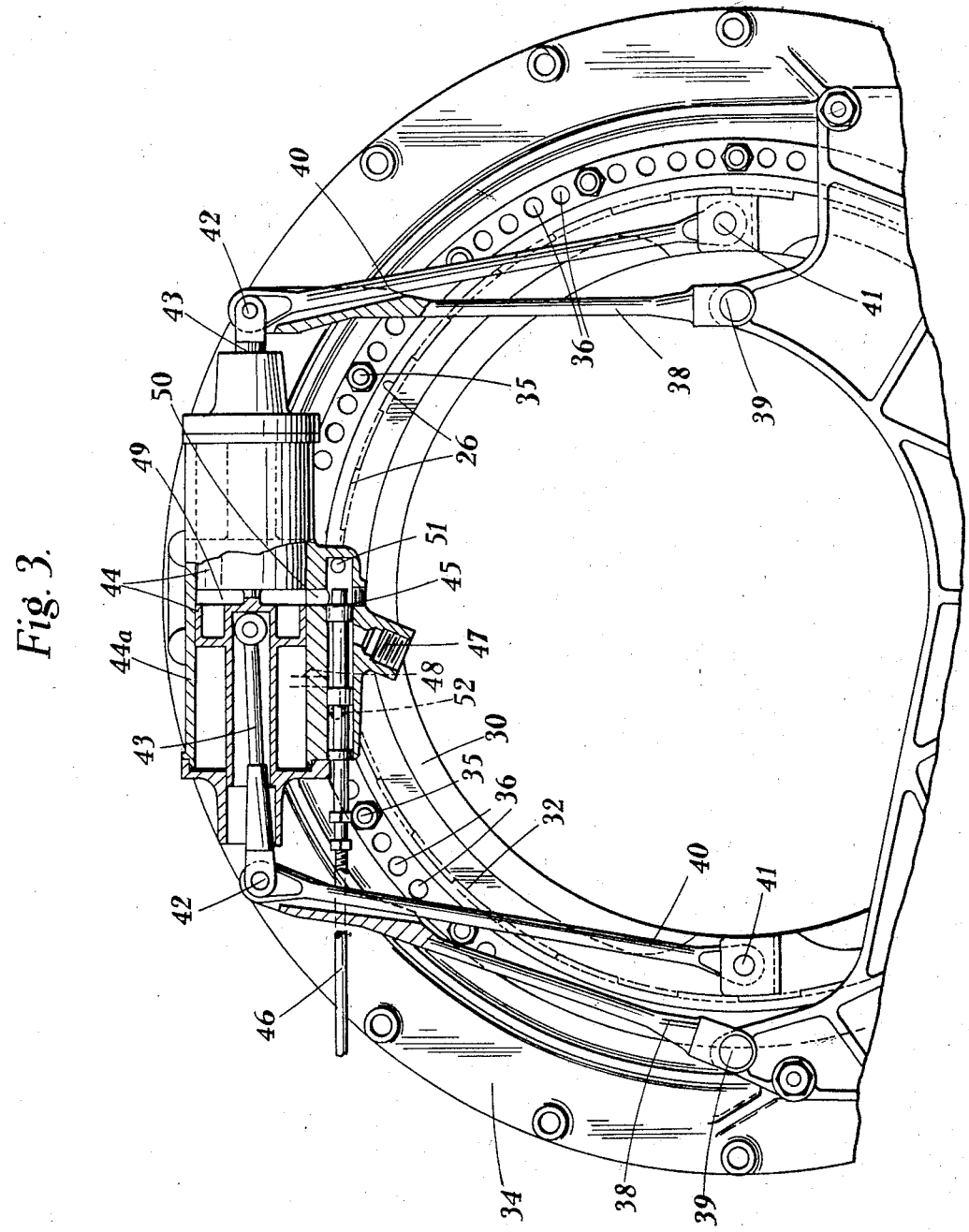

Patented Nov. 23, 1937

2,099,675

UNITED STATES PATENT OFFICE 2,099,675

GEARING FOR DRIVING SUPERCHARGERS ON AIRCRAFT ENGINES

Gerard Mervyn Cutler, Coventry, England, assignor to Armstrong Siddeley Motors Limited, Coventry, England Application November 2, 1936, Serial No. 108,868
In Great Britain October 16, 1936

5 Claims. (Cl. 74—273)

On aircraft internal-combustion engines there is frequently employed a planetary change-speed gearing, which provides two different ratios, through which the rotor of a supercharger can be driven, when desired, at a very high speed from the engine crankshaft. Such gearing must be compact, of small weight and of sufficient strength to withstand the stresses imposed upon it.

Satisfactory forms of gearing providing these requirements will be found in U. S. A. patent specification No. 1,791,393 and British patent specification No. 401,058, in respect of both of which Armstrong Siddeley Motors Limited is the patentee.

In both these earlier constructions there is an internally-toothed driving annulus, a compound planet comprising at least two pinions, a controllable friction brake for holding stationary the planet-carrier to give a countershaft drive, and an overrunning or free-wheel device for holding stationary, when the planet-carrier is released, an externally-toothed reaction gear, in mesh with one of the pinions of the compound planet, for providing a planetary drive.

It is my present object to avoid the need for any such overrunning or free-wheel device whilst complying with the other requirements for a gearing of the kind specified.

The gearing, according to the invention—which also has a compound planet (or in practice a set of three balanced compound planets, as will be well understood), comprising at least two pinions, and means for holding the planet-carrier stationary to give a countershaft drive—has in addition controllable means for holding stationary the reaction gear, in mesh with one of the planet pinions, to give the planetary drive.

A further feature of the invention consists in a common member for selectively holding stationary the planet-carrier or the reaction gear. Preferably such common member is arranged and adapted to be actuated in the manner described in co-pending patent specification No. 108,867.

In the accompanying drawings:—

Figure 1 is a diagrammatic sectional elevation of one form of two-speed gearing, according to the invention, for driving the supercharger of an internal-combustion engine for an aircraft, the bearings, lubrication means and other parts unnecessary for understanding the gearing being omitted for the sake of simplicity;

Figure 2 is a fragmentary sectional elevation, to a larger scale, of a constructional example of the same gearing and the control mechanism therefor; and Figure 3 is a fragmentary end elevation of the control mechanism, also to a larger scale than Figure 1.

Like numerals indicate like parts throughout the drawings.

The drawings show a crankshaft 11 connected to drive the supercharger impeller 12 of an aircraft engine through a two-speed planetary gearing. The gearing includes a driving sun wheel 13 with two sets of teeth, one set of which is placed in driving connection with the crankshaft by means of the sleeve 14 formed with two internal rings of teeth. It will be evident that the driving sun may be driven in other ways and may, for example, as described in the specification accompanying co-pending patent application No. 108,867, take the form of a ring of external teeth on a sleeve driven directly or through a resilient drive from the crankshaft.

The planet-carrier 15 of the gearing (Figures 1 and 2) is formed with a flanged part 16 which can be held or released. The compound planet (of which there are preferably three in practice) comprises a relatively small pinion 17 in mesh with the driven sun 13 and a larger pinion 18 in mesh with the driving sun 19. The smaller pinion 17 is also in mesh with a reaction ring 20 which is shown in the drawings as being held against rotation so that the gearing will operate to give a planetary drive, the planet-carrier 15 being shown as released. When, however, the reaction ring 20 is released and the planet-carrier is held the gearing will operate to give a countershaft drive. In this way two widely-different gear ratios may be obtained, one of which is a very large one, say, 13 to 1.

In practice the flanged part 16 of the planet-carrier 15, as shown in Figure 2, is preferably a separate annulus formed with an internal ring of teeth 21 in mesh with an external ring of teeth 22 on the planet-carrier. 23 (in Figure 2) represents a roller bearing for the hollow shaft 24 of the compound planet. The larger pinion 18 preferably incorporates between its hub and its teeth a known form of centrifugally-acting friction clutch.

The control in this instance through which the two different speeds are introduced includes an annular control member 25 having at 26 a screw-threaded connection with a stationary part 27. The screw-threaded connection preferably comprises a multi-start quick-thread, for example, one of about twenty starts, such that a relatively small rotational movement of the control member will cause sufficient axial movement thereof for it to engage against the adjacent face of the reaction ring 20 (as shown) or the adjacent face of the flange 16, according to the direction of the rotational movement.

In the one end position it clamps the reaction ring 20 against the stationary part 28 preferably through an interposed slidably-mounted ring 29 (Figure 2) and in the other it clamps the flange

16 against the part 30. The latter is in this instance shown as taking the form of an annular control member having at 31 a screw-threaded connection, with the stationary part 32, of equal and opposite sense to that 26 of the control member 25.

33 (Figure 2) represents one of a number of axially-extending dogs on the control member 30 engaged in corresponding notches in the control member 25 so that these two rotate in unison. Thus rotation of one of them (for example, of the control member 30) in one direction causes the simultaneous axial movement of the two members towards one another to grip the flange 16, and rotation of the control member 30 in the other direction causes first the separation of the control members to free the flange 16 and then the engagement of the control member 25 with the reaction ring 20. It is thus impossible for both the flange 16 and the reaction ring 20 to be held at the same time.

For adjustment purposes the two stationary parts 27, 32 are adjustably mounted in the stationary member 34, for example, a portion of the casing, by means of the bolts 35 entered through some of a plurality of holes 36 (Figure 3) in the flange of the stationary part 32 and through some of a plurality of holes 37 (Figure 2) in the stationary member 34. The holes 37 do not occupy identical angular positions with the holes 36 in the stationary part; so that by withdrawing the bolts 35 and moving the stationary part 32 angularly a slight amount, certain other of the holes 36 will be brought into alignment with fresh holes 37 in the stationary member, whereupon the bolts 35 can be re-inserted therethrough to clamp the parts in an adjusted position.

Whereas any appropriate mechanism may be provided for effecting rotation of the control member 30, the drawing shows a pair of toggles each having one link 38 pivotally mounted at 39 on the stationary member and the other link 40 pivotally mounted at 41 on the control member 30, and by movement of the common pivots 42 of the toggles the control member 30 can be rotated. For moving the common pivots the drawing shows the pivots as being connected by piston rods 43 to hydraulically-actuated pistons 44 operating in the ends of a cylinder 44a.

In the position of the slide valve 45 shown in Figure 3 (the slide valve being operated by the control 46), fluid under pressure entering at 47 is supplied by way of a port 48 to a passage indicated at 48a (Figure 2) leading to the ends of the cylinder to force the pistons inwardly towards one another whilst the space 49 between the pistons is exhausting through the port 50 and the outlet 51. In the other extreme position of the slide valve 45 the port 50 is in communication with the inlet 47 and the fluid under pressure supplied therethrough forces the pistons outwardly away from one another whilst the cylinder ends exhaust through the passage 48a, the port 48 and the outlet 52.

The construction described is one which is very compact, of small weight and of sufficient strength to withstand the stresses imposed upon it. The form of control described does not form part of the present invention, being claimed in the specification of my accompanying patent application No. 108,867 above referred to.

What I claim as my invention and desire to secure by Letters Patent of the United States is:—

1. A two-speed gearing, in the drive to the supercharger of an aircraft internal-combustion engine, comprising a driving sun gear, a driven sun gear, a planet-carrier, a compound two-pinion planet, the smaller of the pinions of said compound planet being in mesh with said driving gear, the larger of the pinions of said compound planet being in mesh with said driven gear, an internally-toothed reaction gear in mesh with the smaller of said pinions, controllable braking means for holding said planet-carrier stationary, and controllable braking means for holding said reaction gear stationary, each of said braking means having a member with a screw-threaded connection with a stationary part to exert the braking action on rotation of the member.

2. A two-speed gearing, in the drive to the supercharger of an aircraft internal-combustion engine, comprising a driving sun gear, a driven sun gear, a planet-carrier, a compound two-pinion planet, the smaller of the pinions of said compound planet being in mesh with said driving gear, the larger of the pinions of said compound planet being in mesh with said driven gear, an internally-toothed reaction gear in mesh with the smaller of said pinions, and a controllable double-acting braking means including a member having a screw-threaded connection with a stationary part to exert a braking action on rotation of the member operative in one position for holding said planet-carrier stationary and for leaving said reaction gear released and in the other position for holding said reaction gear stationary and for leaving said planet-carrier released.

3. A two-speed planetary gearing, for use in driving a supercharger of an aircraft engine, including a planet-carrier which can be selectively held or released, a reaction member which can be selectively held or released, and between the two a control member, said control member having a screw-threaded connection with a stationary part and being rotatable to effect the braking of one of the members and at the same time the release of the other.

4. A two-speed planetary gearing, for use in driving a supercharger of an aircraft engine, including a planet-carrier, a flange in driving connection therewith, a reaction ring spaced axially from said flange and between the two a control member, said control member having a screw-threaded connection with a stationary part and being rotatable so that in one end position it effects the braking of one of the members and at the same time the release of the other, and in the other end position it effects the braking of the said other of the members and at the same time the release of the said one.

5. A two-speed planetary gearing, for use in driving a supercharger of an aircraft engine, including a pair of axially-spaced floating rings which can be selectively braked for the two different gear ratios, an annular control member disposed between said rings, said control member having a screw-threaded peripheral connection with a stationary part, and means for rotating said control member to cause it to effect the braking of either of said rings and at the same time the release of the other.

GERARD M. CUTLER.